(12) United States Patent
Ikeda

(10) Patent No.: US 10,328,480 B2
(45) Date of Patent: Jun. 25, 2019

(54) CLAMP APPARATUS

(71) Applicant: AMADA HOLDINGS CO., LTD., Kanagawa (JP)

(72) Inventor: Seishiro Ikeda, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 106 days.

(21) Appl. No.: 15/315,156

(22) PCT Filed: Jun. 2, 2015

(86) PCT No.: PCT/JP2015/065918
§ 371 (c)(1),
(2) Date: Nov. 30, 2016

(87) PCT Pub. No.: WO2015/186706
PCT Pub. Date: Dec. 10, 2015

(65) Prior Publication Data
US 2017/0182542 A1  Jun. 29, 2017

(30) Foreign Application Priority Data
Jun. 3, 2014  (JP) ................................ 2014-115326

(51) Int. Cl.
*B21D 5/02* (2006.01)
*B21D 37/14* (2006.01)
(Continued)

(52) U.S. Cl.
CPC .............. *B21D 37/14* (2013.01); *B21D 5/02* (2013.01); *B21D 5/0236* (2013.01); *B21D 37/04* (2013.01); *F16B 2/185* (2013.01)

(58) Field of Classification Search
CPC ........ B21D 5/02; B21D 37/14; B21D 5/0209; B21D 5/0236
(Continued)

(56) References Cited

U.S. PATENT DOCUMENTS 5,390,527 A * 2/1995 Kawano ............... B21D 5/0209
72/462
5,619,885 A * 4/1997 Kawano ............... B21D 5/0209
72/389.3
(Continued)

FOREIGN PATENT DOCUMENTS

| JP | 6-23436 | 2/1994 |
| JP | 7-195375 | 8/1995 |

(Continued)

OTHER PUBLICATIONS

Search Report issued in Japan Patent Application No. PCT/JP2015/065918, dated Sep. 8, 2015.

*Primary Examiner* — David B Jones
(74) *Attorney, Agent, or Firm* — Greenblum & Bernstein, P.L.C.

(57) ABSTRACT

To provide a clamp apparatus including swinging fulcrums on a side of a swinging body, in which the clamp apparatus swings about the swinging fulcrum at the time of opening a channel mouth and at an initial stage to start clamping of the channel mouth, and as swinging for the clamping progresses, the clamp apparatus shifts to other swinging fulcrum located at an upper part of a clamping point to complete clamping.

2 Claims, 4 Drawing Sheets

(51) Int. Cl.
*B21D 37/04* (2006.01)
*F16B 2/18* (2006.01)

(58) Field of Classification Search
USPC .......................................................... 72/481.1
See application file for complete search history.

(56) References Cited

U.S. PATENT DOCUMENTS

| | | | | |
|---|---|---|---|---|
| 5,794,486 A | * | 8/1998 | Sugimoto | B21D 5/0236 72/462 |
| 6,003,360 A | * | 12/1999 | Runk | B21D 5/0236 72/389.3 |
| 6,263,721 B1 | * | 7/2001 | Kawano | B21D 5/0209 72/462 |
| 6,446,485 B1 | * | 9/2002 | Tarasconi | B21D 5/02 72/481.1 |
| 6,848,291 B1 | * | 2/2005 | Johnson | B21D 5/0209 72/481.1 |

FOREIGN PATENT DOCUMENTS

| | | |
|---|---|---|
| JP | 10-146617 | 6/1998 |
| JP | 2002-219517 | 8/2002 |
| WO | 98/22236 | 5/1998 |

\* cited by examiner

CLAMP APPARATUS

TECHNICAL FIELD

The present invention relates to a clamp apparatus used for removably clamping a clamping target object, for example, a press die including a punch (an upper die) and a die (a lower die), which is used in a bending machine such as a press brake that bends a sheet metal or the like.

BACKGROUND ART

In order to removably set and fix a press die such as a punch (an upper die) and a die (a lower die), a clamp apparatus for a mold as described in Patent Literature 1 listed below is used as an apparatus for setting this kind of die, in which a vertical die abutting surface that can abut on one side surface of a die is provided in a holder body that supports the die, and a clamping plate facing the die abutting surface and abutting on the other side surface of the die is attached to the holder body via a clamping tool (for example, see Patent Literature 1).

CITATION LIST

Patent Literature

Patent Literature 1: Japanese Patent Application Laid-open No. 2002-219517

DISCLOSURE OF INVENTION

Problem to be Solved by the Invention

However, in such a conventional clamp apparatus for mold, every time a die is attached or detached, a plurality of bolts need to be turned, individually, which deteriorates the workability. Further, because a time is required for replacing a die, the operation rate decreases in case die replacement is performed frequently.

Furthermore, a configuration that enables to obtain a tighter clamping force with less power has been desired.

The present invention has been achieved in view of such circumstances, and an object of the present invention is to provide a clamp apparatus that can removably set and fix a fixing target object such as a press die with a simple structure and by a simple operation, and can provide a large clamping force by less power.

Means for Solving Problem

In order to solve the above problems and to achieve the above object, a first aspect of the present invention provides a clamp apparatus in which a clamp portion is a channel mouth in cross-section and that performs clamping while, with respect to one fixed support body, other swinging body swings to narrow down an opening portion of the channel mouth in the clamp portion, wherein the clamp apparatus comprises two swinging fulcrums on a side of the swinging body; the swinging body swings about a first swinging fulcrum of the two swinging fulcrums at a time of opening the channel mouth and at an initial stage to start clamping of the channel mouth; and, as the swinging body swinging for the clamping progresses, the swinging body swings shiftedly about other swinging fulcrum of the two swinging fulcrums being a second swinging fulcrum located at an upper part of a clamping point, to complete clamping.

According to the configuration described above, in order to clamp an object to be fixed, the opening portion of the channel mouth is expanded to put the object into the channel mouth, and narrowing of the opening portion of the channel mouth is then started. Until that time, the clamp apparatus swings about the first swinging fulcrum of the swinging body on a side facing the fixed support body. As swinging for the clamping progresses, the clamp apparatus shifts to the second swinging fulcrum at an upper part of a clamping point, to complete clamping. At this time, the top of the opening portion of the channel mouth becomes the second swinging fulcrum, and the object is clamped with the strongest force at a position where the top of the opening portion of the channel mouth, which is a swinging fulcrum of the swinging body, abuts on the object to be clamped.

According to a second aspect of the present invention, in the clamp apparatus specified in the first aspect of the present invention, an elastic body that biases the swinging body in a direction of reducing a size of the channel mouth is provided in an apparatus body configured by the fixed support body and the swinging body, on a side of the channel mouth of the clamp apparatus; and, when swinging for clamping progresses and a fulcrum is shifted to the second swinging fulcrum at the upper part of the clamping point, the clamping becomes tighter due to biasing of the elastic body at the upper part of the clamping point.

Effect of the Invention

According to the configuration of the present invention described above, the following remarkable effect can be achieved. In order to clamp an object to be fixed, the opening portion of the channel mouth is expanded to put the object into the channel mouth, and narrowing of the opening portion of the channel mouth is then started. Until that time, the clamp apparatus swings about the first swinging fulcrum of the swinging body on a side facing the fixed support body. As swinging for the clamping progresses, the clamp apparatus shifts to the second swinging fulcrum at an upper part of a clamping point, to complete clamping. At the time of completion of the clamping, the top of the opening portion of the channel mouth becomes the second swinging fulcrum, thereby enabling the object to be clamped with the strongest force at a position where the top of the opening portion of the channel mouth, which is the swinging fulcrum of the swinging body, abuts on the object to be clamped.

Furthermore, as described above, in the case of a configuration in which an apparatus body configured by a fixed support body and a swinging body on the channel mouth side of the clamp apparatus includes an elastic body that biases the channel mouth in a direction of narrowing down the channel mouth, when swinging for clamping progresses and a fulcrum shifts to the second swinging fulcrum at an upper part of a clamping point, tighter clamping can be achieved by biasing of the elastic body at the upper part of the clamping point.

Therefore, an object to be fixed such as a press die can be set and fixed removably with a simple configuration and by a simple operation. Therefore, as compared to the conventional clamp apparatus in which plural bolts need to be turned individually every time an object to be fixed is attached or detached, higher workability can be provided and also a replacement operation of a press die or the like can be performed within a short period of time. Therefore, even when the replacement is performed frequently, a high operation rate can be maintained and cost reduction can be achieved.

Further, a unique clamping manner in which there are two swinging fulcrums and at the last stage of clamping, the fulcrum shifts to the second swinging fulcrum at the upper part of the clamping point is used, and in the principle of leverage, the fulcrum and the point of effort are located at the farthest positions from each other in the final form. Accordingly, the strongest clamping force can be acquired with less power, whereby clamping is performed. This is the greatest characteristic of the present invention.

BRIEF DESCRIPTION OF THE DRAWINGS

FIG. 1(b) is a front view showing the configuration according to the embodiment.

EMBODIMENT FOR CARRYING OUT THE INVENTION

Figure 1:
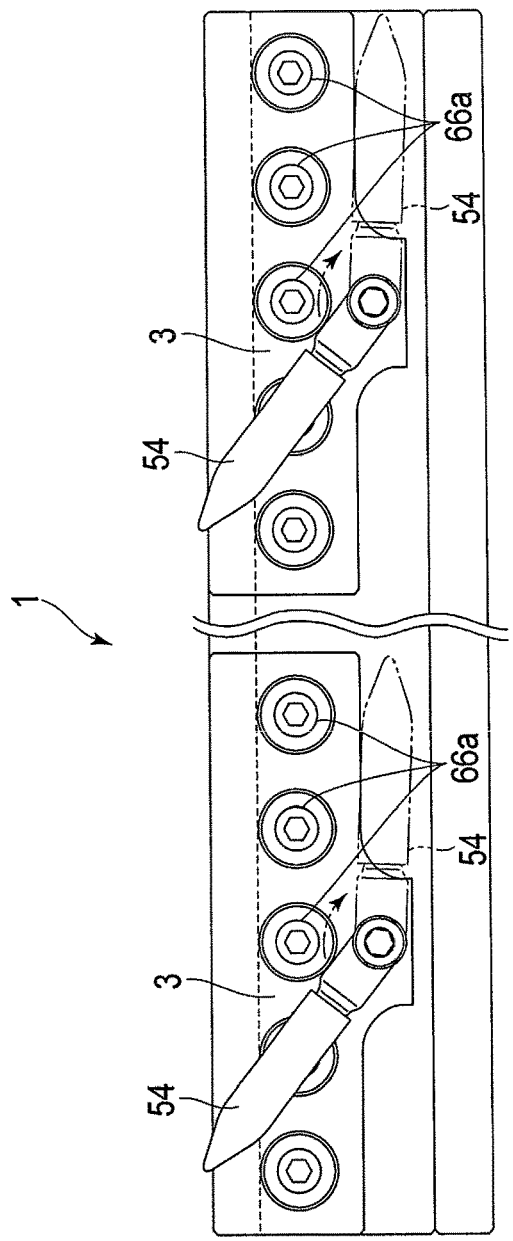
FIGS. 1(a) and 1(b) FIG. 1(a) is a sectional side view showing a configuration according to one embodiment of the present invention.

An embodiment of the present invention is explained below with reference to an illustrated example. FIG. 1(a) to FIG. 4 show a configuration of a clamp apparatus according to an embodiment of the present invention, which is used at the time of bending, such as a press brake that bends a sheet metal or the like. The clamp apparatus removably sets and fixes a press die P such as a punch (an upper die) and a die (a lower die), to be held in a channel mouth CM in upper-part cross-section, which is formed between a fixed support body 2 and a swinging body 3 provided in an apparatus body 1 and which forms an opening (the channel mouth CM is provided by recessedly forming a channel that is open on the side of the swinging body 3 at an upper part of the fixed support body 2 in a laterally longitudinal direction of the apparatus body 1 as shown in FIG. 1(b)).

Specifically, the clamp apparatus includes the fixed support body 2 provided in the apparatus body 1, the swinging body 3 provided so as to be capable of swinging in a clamping direction with respect to the fixed support body 2 about a first swinging fulcrum 4a so as to clamp the press die P (at the last stage of the clamp operation, the swinging fulcrum shifts from the first swinging fulcrum 4a to a second swinging fulcrum 4b) that abuts on a surface of the fixed support body 2 facing thereto, and an operating device 5 that performs opening of the channel mouth CM and clamping of the channel mouth CM by operating a handle lever 54 provided on a lower side of the apparatus body 1 configured by the fixed support body 2 and the swinging body 3.

The operating device 5 is configured by spiral holes 50a and 52a passing through a lower part of the apparatus body 1 configured by the fixed support body 2 and the swinging body 3, an adjustment screw 50b and an operation screw 52b threaded into the spiral holes 50a and 52a, respectively, and the handle lever 54 attached on the side of the operation screw 52b. The operating device 5 performs an operation to open the channel mouth CM and another operation of clamping at the channel mouth CM by operating the handle lever 54. By adjusting an amount of protrusion or an amount of dent from the spiral hole 50a, the adjustment screw 50b adjusts an amount of swinging of the swinging operation of the swinging body 3 (an amount of a clearance CU indicated in an upper part of FIG. 2, an amount of a clearance CL1 indicated in a lower part of FIG. 3, and an amount of a clearance CL2 indicated in a lower part of FIG. 4) between the amount of protrusion and the amount of dent of the operation screw 52b from the spiral hole 52a by a turning action of the handle lever 54 (performs adjustment of the amount of swinging of the swinging body 3 in a clockwise direction and a counterclockwise direction in FIGS. 2 to 4).

In the present embodiment, the apparatus body 1 also includes a holding device 6 that crimps the fixed support body 2 and the swinging body 3 with an elastic force by using an elastic body 64 and a bolt 66, on a side close to the channel mouth CM of the apparatus body 1. That is, the holding device 6 includes a screw hole 60 on a side of the fixed support body 2 and a head buried port 62 that houses a bolt head 66a therein on a side of the swinging body 3. The screw hole 60 and the head buried port 62 are drilled substantially in parallel to the spiral holes 50a and 52a, the adjustment screw 50b, and the operation screw 52b. The elastic body 64 configured by a spring member such as a spring or a disc spring is embedded on a side of the head buried port 62. By causing the bolt 66 to pass through the center of the elastic body 64 to be threaded into the screw hole 60, the fixed support body 2 and the swinging body 3 are crimped with the elastic force while reducing the size of the elastic body 64 with the bolt head 66a. Accordingly, the elastic body 64 of the holding device 6 biases the channel mouth CM in a direction of reducing the size of the channel mouth CM. At this time, the holding device 6 does not completely fix the swinging body 3 to the fixed support body 2 but merely crimps the swinging body 3 thereto with the elastic force. Therefore, the elastic body 64 is set according to the tightening of the bolt 66 so as to obtain a specified load.

Figure 2:
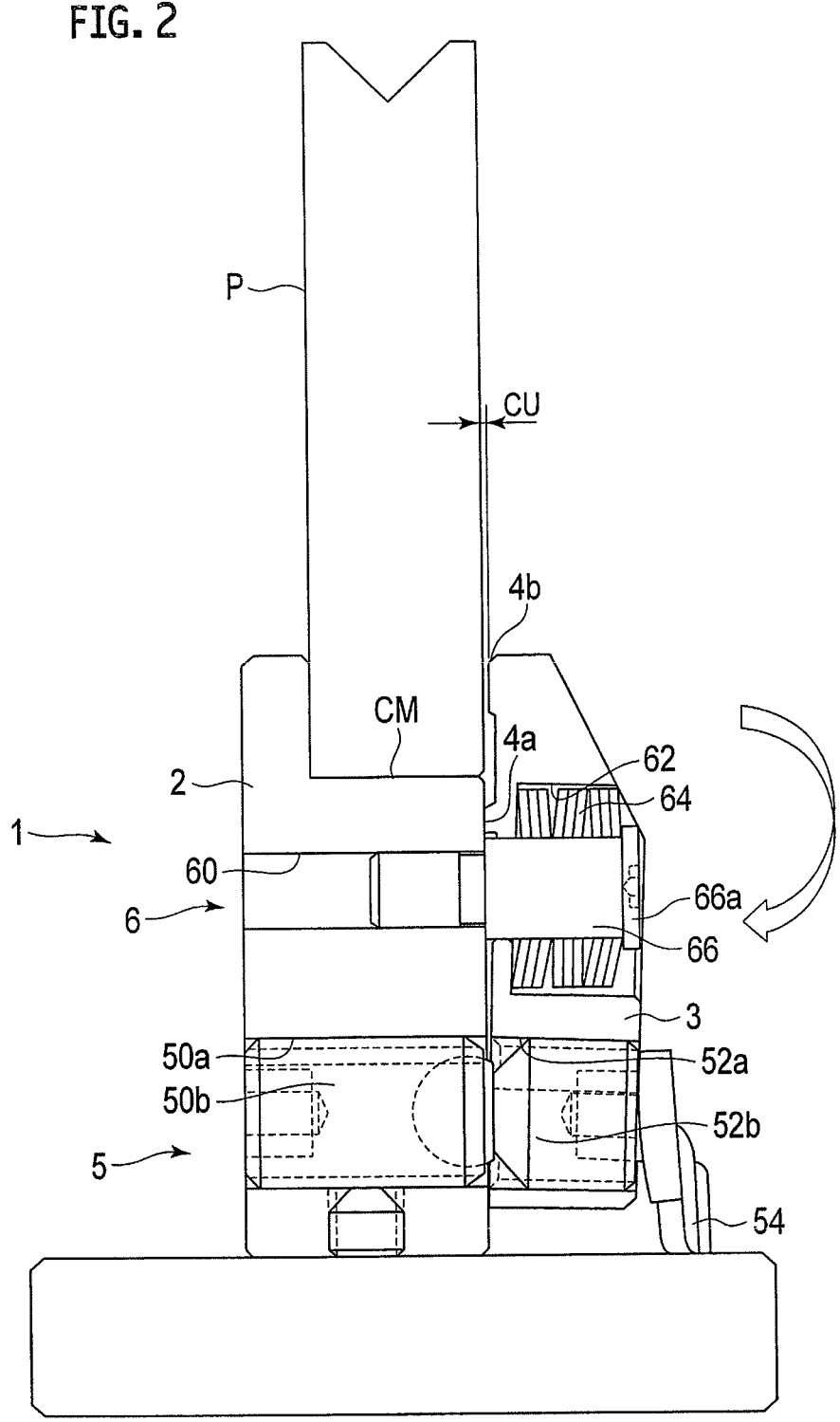
FIG. 2 is a sectional view of a clamp apparatus, showing a state where a channel mouth CM is opened to insert a press die P in the configuration of the embodiment.

In the configuration described above, the swinging body 3 includes two swinging fulcrums of the first and second swinging fulcrums 4a and 4b as described above on the side of the fixed support body 2 facing thereto. At the time of opening the channel mouth CM, the handle lever 54 of the operating device 5 is moved down as shown in FIG. 2 to swing the swinging body 3 about the first swinging fulcrum 4a to expand the channel mouth CM (to expand the clearance shown in the upper part in FIG. 2), and the press die P is inserted therein. That is, by the operation of the handle lever 54, the load of the elastic body 64 is turned about the first swinging fulcrum 4a in the clockwise direction in the drawing, until there are no lower clearances CL1 and CL2 in FIGS. 3 and 4 and the upper clearance CU shown in FIG. 2 is generated, thereby enabling the press die P to be detached and attached therefrom/thereto.

Figure 3:
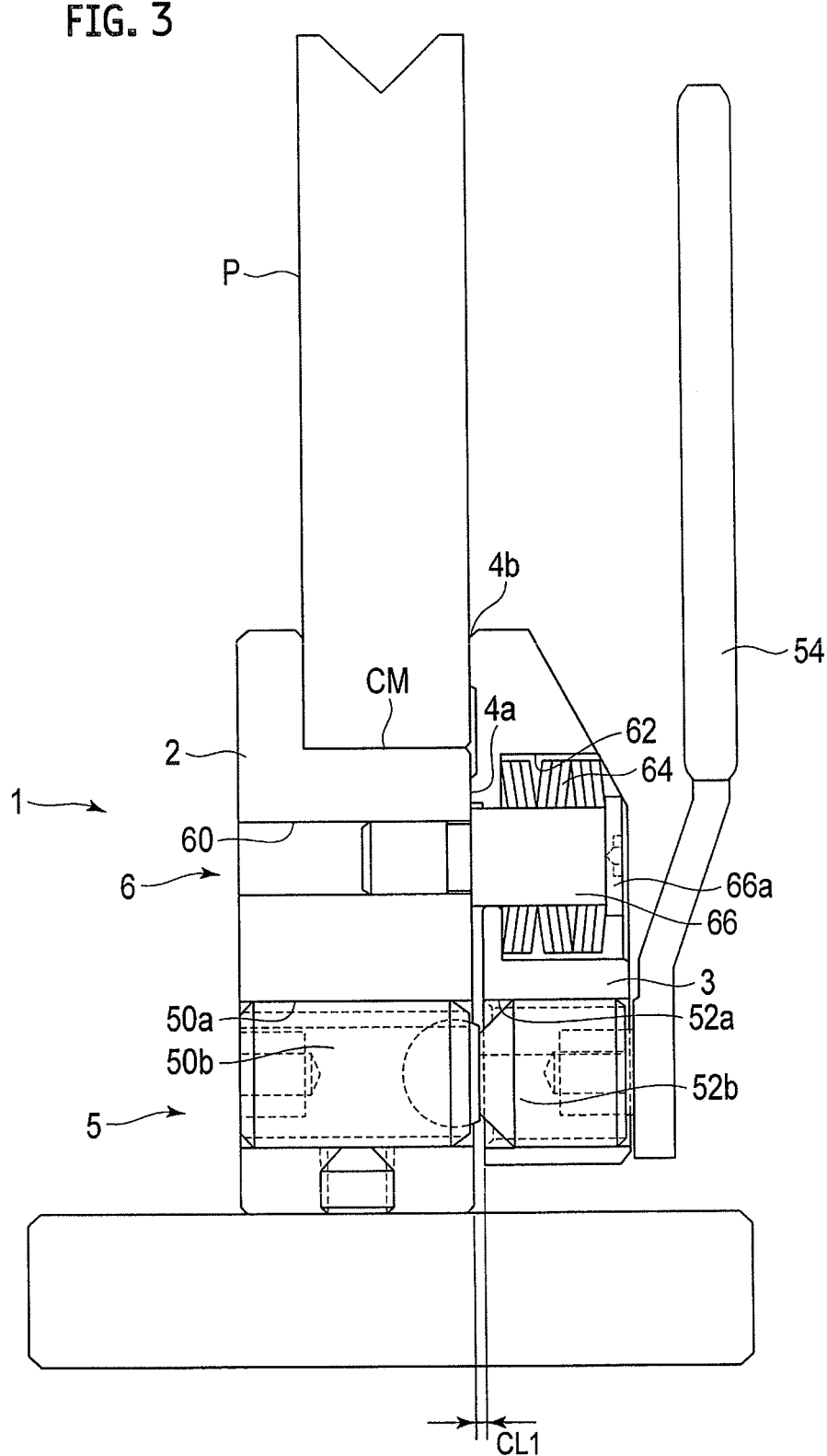
FIG. 3 is a sectional view of the clamp apparatus, showing a state in the middle of operating a handle lever to perform clamping at the channel mouth CM of the press die P in the configuration of the embodiment.

To put the press die P into the channel mouth CM, clamping of the channel mouth CM is started while the handle lever 54 is lifted up as shown in FIG. 3. Also at an initial stage to start clamping, the swinging body 3 swings about the first swinging fulcrum 4a. At this time, the upper clearance CU in the upper part of FIG. 2 disappears and the clearance CL1 starts to open on a lower side as shown in FIG. 3. That is, when the operation screw 52b is screwed into the spiral hole 52a by moving the handle lever 54 upward, the lower clearances CL1 and CL2 (see FIGS. 3 and 4) of the swinging body 3 expand.

Specifically, when the handle lever 54 is lifted up, the operation screw 52b fixed to the handle lever 54 is turned. At this time, a spherical member provided in a protruding manner on the left side of the operation screw 52b (in the left direction in FIGS. 2 to 4) turns in a spherical space formed in the adjustment screw 50b in a concave shape as a spherical bearing unit. Because the adjustment screw 50b is fixed to the fixed support body 2, the lower part of the swinging body 3 moves rightward (in the right direction in FIGS. 3 and 4) due to the lead of a threaded portion between the spiral hole 52a and the operation screw 52b when the operation screw 52b turns. Accordingly, the swinging body 3 swings in the counterclockwise direction in FIG. 3 about the first swinging fulcrum 4a and the clearance CL1 starts to open on the lower side as shown in FIG. 3.

Figure 4:
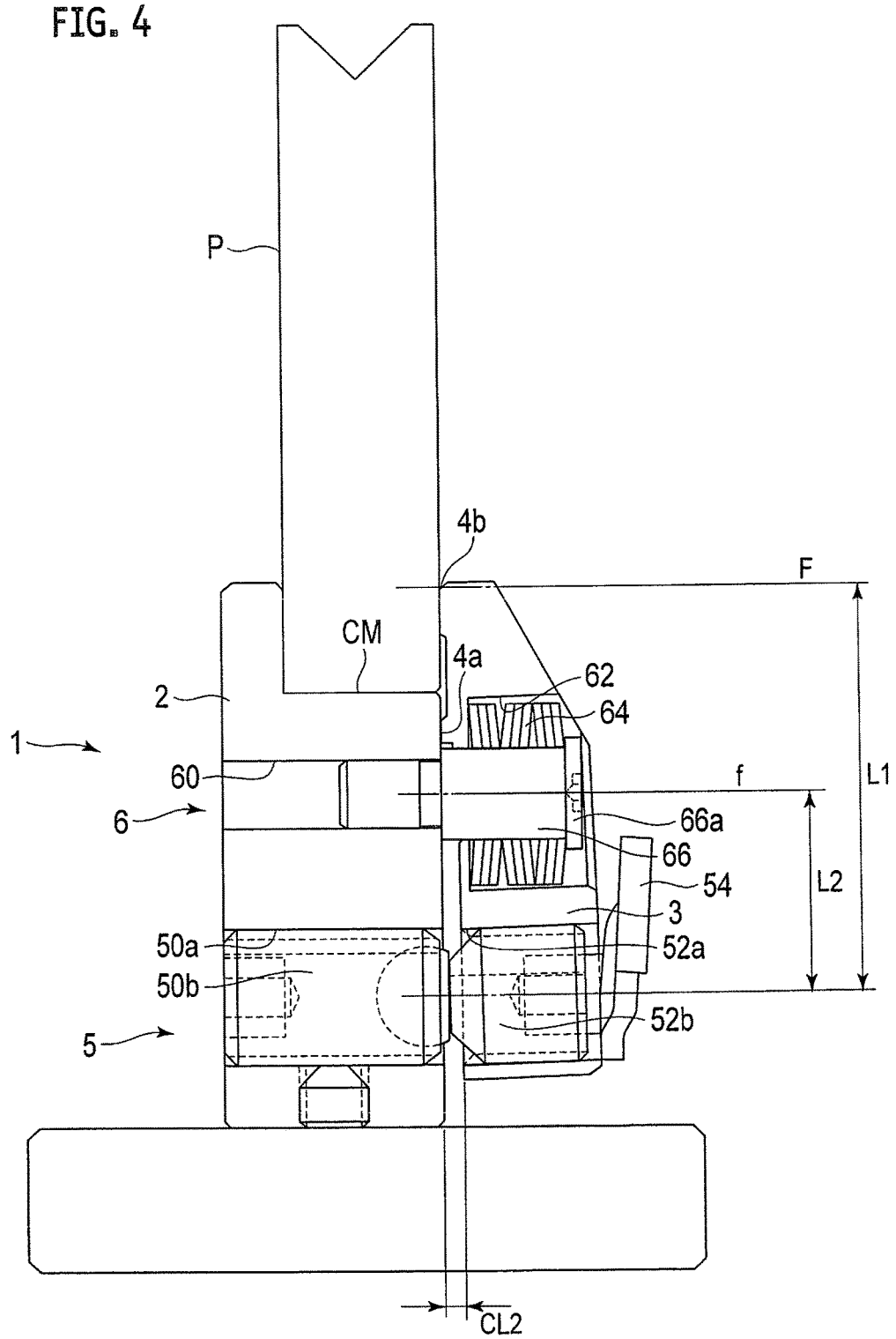
FIG. 4 is a sectional view of the clamp apparatus, showing a state where the handle lever is further operated and the clamping at the channel mouth CM of the press die P is completed in the configuration of the embodiment.

Meanwhile, when the handle lever 54 of the operating device 5 is fully pulled down and swinging for clamping the press die P progresses as shown in FIG. 4, the fulcrum shifts to the other swinging fulcrum (second swinging fulcrum) 4b of the swinging body 3 (at the upper part of the clamping point) correspondingly thereto, so that the clamping is completed. At this time, as shown in FIG. 4, the lower clearance CL2 has the largest clearance amount adjusted by the adjustment screw 50b. Because the elastic body 64 is located on the upper side of the operation screw 52b, the upper part of the swinging body 3 works in a direction becoming close contact with the fixed support body 2. If the operation screw 52b turns by more than a certain amount, an upper end of the swinging body 3, that is, the second swinging fulcrum 4b becomes close contact with the press die P, and the press die P is reliably clamped by the fixed support body 2 and the swinging body 3 due to an action of a tightening force $F=(f \times L_2)/L_1$. An opening amount at the time of expanding the channel mouth CM and a shift timing from the first swinging fulcrum 4a to the second swinging fulcrum 4b are adjusted by such adjustment that the adjustment screw 50b, whose turn is normally controlled by the screw member positioned at the lower part thereof, is turned by canceling the turning control with the screw member and the adjustment screw 50b is moved in the right and left directions in FIGS. 2 to 4.

As described above, in order to clamp the press die P to be fixed, the opening portion of the channel mouth CM is expanded by the operation of the handle lever 54 to hold the press die P in the channel mouth CM, and the handle lever 54 is then lifted upward to start to narrow down the opening portion of the channel mouth CM. Until that time, the first swinging fulcrum 4a of the swinging body 3 is the swinging center around which the swinging body 3 swings in a direction of gradually narrowing down the channel mouth CM.

Subsequently, as swinging for clamping the press die P progresses, the fulcrum shills to the second swinging fulcrum 41) to complete clamping.

At this time, a top part of the opening portion of the channel mouth CM becomes the second swinging fulcrum 4b, and the channel-mouth opening top, which is the second swinging fulcrum 4b of the swinging body 3, is clamped with a strongest force F at a position (the second switching fulcrum 4b) where the channel-mouth opening top abuts on the press die P to be clamped. That is, a unique clamping manner in which the fulcrum shifts to the second swinging fulcrum 4b at an upper part of a clamping point at the time of completion of the clamping operation is used and, in the principle of leverage, the fulcrum and the point of effort are located at the farthest positions from each other in the final form. Accordingly, the strongest clamping force F can be acquired with less power, whereby clamping is performed.

Furthermore, in the present embodiment, in addition to the configuration described above, the elastic body 64 that biases the channel mouth CM in the direction of reducing the size of the channel mouth CM is provided in the apparatus body 1 configured by the fixed support body 2 and the swinging body 3, on the side of the channel mouth CM. Accordingly, when swinging for the clamping progresses and the fulcrum shifts to the second swinging fulcrum 4b, the upper part of the clamping point can clamp the channel mouth CM more tightly due to biasing of the elastic body 64.

Therefore, according to the configuration of the present embodiment, a press die or the like can be set and fixed removably with a simple configuration and by a simple operation. Accordingly, as compared to the conventional clamp apparatus in which plural bolts need to be turned individually every time a press die or the like is attached or detached, higher workability can be provided and a replacement operation of a press die or the like can be performed within a short period of time. Therefore, even when the replacement is performed frequently, a high operation rate can be maintained and cost reduction can be achieved.

The invention achieved by the present inventors has been described specifically based on the embodiment described above. However, the clamp apparatus of the present invention is not limited only to the illustrated example and can be variously modified without departing from the scope of the present invention.

As can be understood from the descriptions of the embodiment described above and illustrations of FIGS. 2 to 4, according to the present embodiment, the swinging body 3 is swingably supported by the bolt 66 as an example of the support member in the holding device 6. The elastic body 64 such as the disc spring is elastically installed between the bolt head 66a of the bolt 66 and the swinging body 3. The first swinging fulcrum 4a is provided in the swinging body 3 in a protruding manner between the tip of the swinging body 3 and the bolt 66, and the second swinging fulcrum 4b is provided at the tip of the swinging body 3 in a protruding manner.

That is, the first swinging fulcrum 4a and a shaft center of the bolt 66 as the support member are located eccentrically in a vertical direction. In retrospect, the first swinging fulcrum 4a is provided to be displaced with respect to the shaft center of the bolt 66 toward the tip side of the swinging body 3. Therefore, a biasing force (an accumulated energy force) of the elastic body 64 works in a direction of opening the tip side of the swinging body 3, using the first swinging fulcrum 4a as the fulcrum. Accordingly, when clamping of the press die P is released, the second swinging fulcrum 4b provided at the tip of the swinging body 3 is naturally separated from the press die P. This eliminates the need of an operation of separating the swinging body 3 from the press die P at the time of detaching the press die P. That is, efficiency in detachment of the press die P is improved.

In the configuration described above, when the press die P is to be strongly tightened and fixed (pressed and fixed) to the side of the fixed support body 2 at the second swinging fulcrum 4b at the tip of the swinging body 3 by operating the handle lever 54, the swinging body 3 swings in the counterclockwise direction in FIGS. 2 to 4 in the initial state, using the first swinging fulcrum 4a as the fulcrum. When the handle lever 54 is turned further in the same direction to tighten and fix the press die P more strongly after the second swinging fulcrum 4b at the tip abuts on the press die P, the first swinging fulcrum 4a of the swinging body 3 tends to be away from the fixed support body 2, and the elastic body 64 is strongly compressed. That is, the swinging body 3 is swung using the second swinging fulcrum 4b at the tip as the fulcrum and tightens the press die P strongly. At this time, the energy storing force of the compressed elastic body 64 also works as a force tightening the press die P.

The entire contents of Japanese Patent Application No. 2014-115326 (filed on Jun. 3, 2014) are incorporated herein by reference.

INDUSTRIAL APPLICABILITY

The clamp apparatus according to the present invention is not limited to a clamp apparatus for a mold or the like, and the present invention can be applied to any clamp apparatus that fixes an object.

The invention claimed is:

1. A clamp apparatus for clamping a tool, the clamping apparatus comprising:
   a clamping body having a fixed support body and a swinging body, the fixed support body and the swinging body cooperating to define a clamp portion that includes an opening portion having a channel mouth in cross-section and configured to receive the tool,
   wherein the channel mouth is configured to clamp the tool in response to the swinging body being pivoted in a clamping direction towards the fixed support body such that the opening portion of the channel mouth is narrowed,
   an elastic body provided in the clamping body, wherein the elastic body is provided on a side of the channel mouth and biases the swinging body in a direction toward the fixed support body such that a size of the channel mouth is reduced,
   a first swinging fulcrum and a second swinging fulcrum provided on a side of the swinging body, wherein the swinging body is configured to pivot about the first swinging fulcrum at a time of opening the channel mouth so as to release the tool and at an initial stage so as to start clamping the tool,
   the second swinging fulcrum being positioned at an upper part of a clamping point defined proximate an entrance of the opening portion of the channel mouth,
   the first swinging fulcrum being provided displaced, with respect to a shaft center of the elastic body, in a direction towards the second swinging fulcrum, and
   the swinging body being configured such that, as the swinging body pivots in the clamping direction, the swinging body shiftedly pivots about the second swinging fulcrum to complete clamping of the tool.

2. The clamp apparatus according to claim 1, wherein, upon pivoting the swinging body in the clamping direction, the biasing of the elastic body at the upper part of the clamping point tightens the clamp.

* * * * *